May 30, 1933. W. NOTTEBOHM 1,911,922
RECOVERY OF AMMONIA FROM VAPOR MIXTURES
Filed July 9, 1930
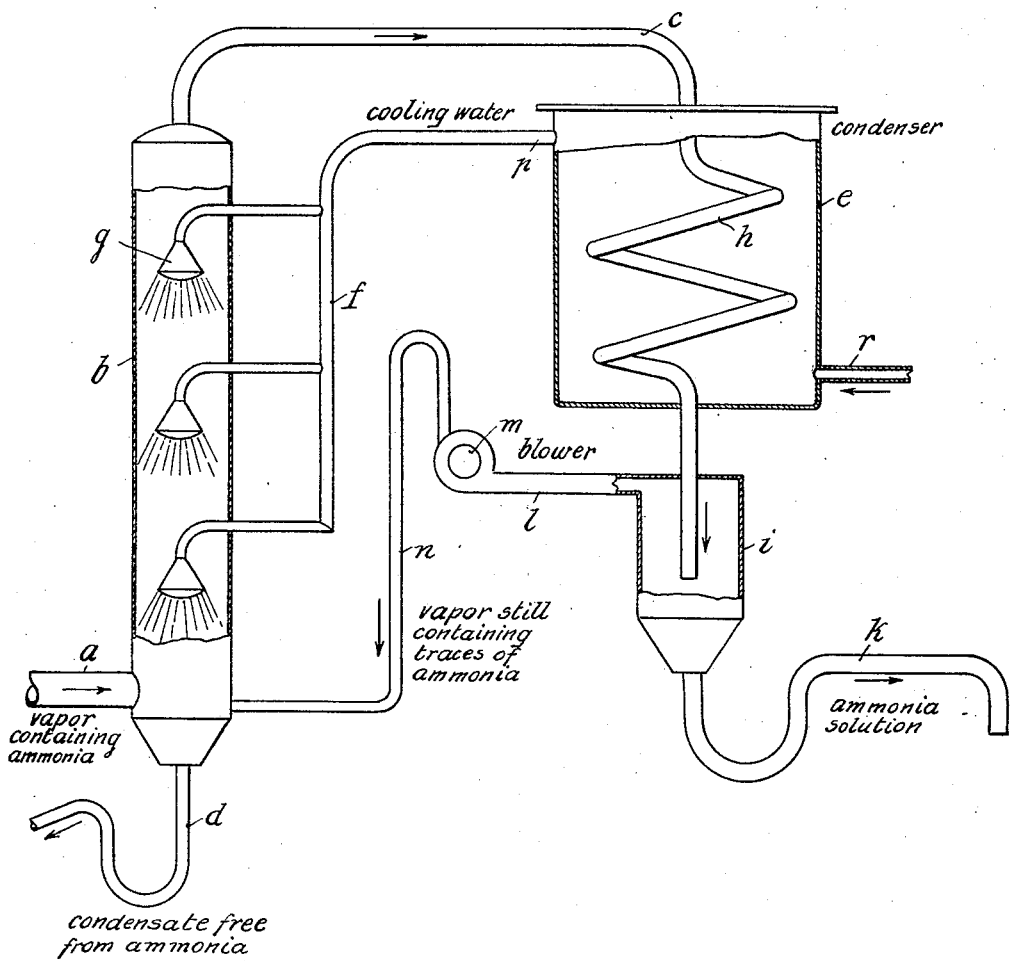
Inventor:
Walter Nottebohm
by Karlekirkaue,
Atty.

UNITED STATES PATENT OFFICE

WALTER NOTTEBOHM, OF WANNE-EICKEL, GERMANY, ASSIGNOR TO PATENTVERWERTUNGS A. G. ALPINA, S. A. POUR L'EXPLOITATION DE BREVETS ALPINA, PATENTS EXPLOITATION CY, ALPINA LTD., OF BASEL, SWITZERLAND

RECOVERY OF AMMONIA FROM VAPOR MIXTURES

Application filed July 9, 1930, Serial No. 466,647, and in Germany July 16, 1929.

My invention refers to the recovery of ammonia from vapor mixtures containing same and more especially from the mixtures of water and ammonia vapors forming in the production of ammonium salts. As is well known to those skilled in the art, ammonium salts are produced for instance by introducing gaseous or vaporous ammonia into acids, such as for instance sulfuric acid, until a neutral reaction is obtained. As the reaction between the acid and the ammonia is an exothermic one, the heat developed in the mixture causes the development of water vapors and these vapors are known to carry away with them some ammonia. Apart from the losses of ammonia this gas, owing to its pungent smell, also creates many inconveniences to the operators.

According to the present invention I obviate this drawback and succeed in recovering the ammonia, admixed with the water vapors, by causing these vapors to be condensed at a temperature above that at which ammonia still appreciably dissolves in water. The range of temperature at which the new process can be carried out with advantage is about 85–95° C. Preferably condensation of the vapor is allowed to take place at about 95° C. At this temperature the capacity of water for dissolving ammonia is extremely low. Therefore, the ammonia gas, instead of remaining in the condensing water, will escape with the non-condensed water vapor and will form a comparatively concentrated ammonia solution, which can be recovered for further use.

In the drawing affixed to the specification and forming part thereof, an apparatus for carrying out this process is illustrated diagrammatically by way of example in vertical section.

Referring to the drawing, $a$ is the pipe through which the mixture of water vapor and ammonia gas resulting from the neutralization of the acid with ammonia is introduced into the sprinkling tower $b$, provided with sprinklers $g$, which are supplied with water from an overflow $p$ in the condenser vessel $e$, which is supplied with water through pipe $r$. Through pipe $d$ a condensate free from ammonia escapes, while the comparatively concentrated mixture of water vapor and ammonia flows through the pipe $c$ and condenser coil $h$, where it is condensed to form a comparatively concentrated ammonia solution. This solution is taken up by the container $i$ and can escape through pipe $k$. From the top of the container $i$ a pipe $l$ leads to a pump or blower $m$, which will suck off the ammonia vapor, which may have escaped condensation and will force it back into the bottom portion of the sprinkler tower $b$.

The quantity of water escaping from the sprinklers $g$ is regulated in such manner, that the hot vapor mixture supplied through $a$ is cooled down only to about 95° C.

The ammonia solution escaping through $k$ may be utilized either as such or for the production of an ammonium salt, or may be returned into the process for dilution purposes.

Obviously no ammonia vapor can escape as such into the surrounding air.

Obviously means may be provided in connection with the pump or blower $m$ or otherwise, whereby the apparatus as a whole is placed under a pressure below atmospheric, thereby causing an acceleration in the evaporation in the neutralizing vessel (not shown), and further reducing the dissolving capacity of water for ammonia, so that condensation can be carried through in the sprinkler tower $b$ at a lower temperature.

Various changes may be made in the details disclosed in the foregoing specification without departing from the invention or sacrificing the advantages thereof.

I claim:

1. The method of recovering ammonia from a mixture of water vapor and ammonia comprising passing such mixture through a shower of water, regulated to produce a condensate having a temperature of 5 to 15° C. below the boiling point of water.

2. The method of recovering ammonia from a mixture of water vapor and ammonia comprising passing such mixture at a pressure below atmospheric pressure through a shower of water, regulated to produce a condensate having a temperature of 5 to 15° C.

below the boiling point of water at the prevailing pressure.

3. The method of recovering ammonia from a mixture of water vapor and ammonia comprising passing such mixture through a shower of water regulated to produce a condensate having a temperature of 95° C.

In testimony whereof I affix my signature.

WALTER NOTTEBOHM.